LEON J. LADER,
JOHN G. SINCLAIR, JR.,
INVENTORS

ATTORNEY

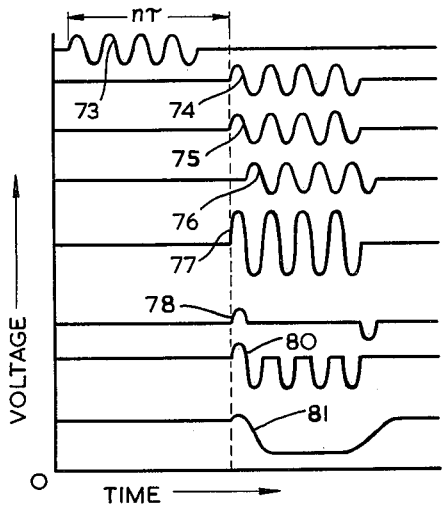
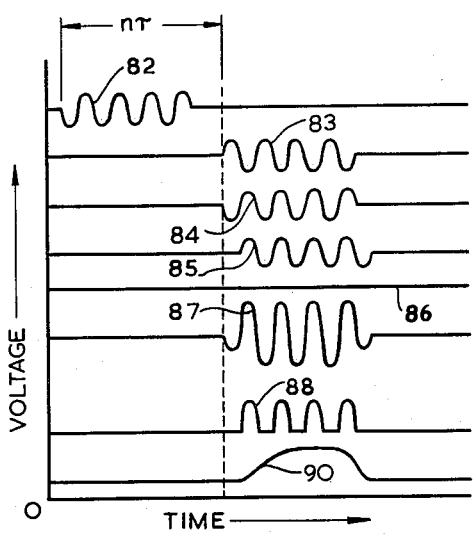
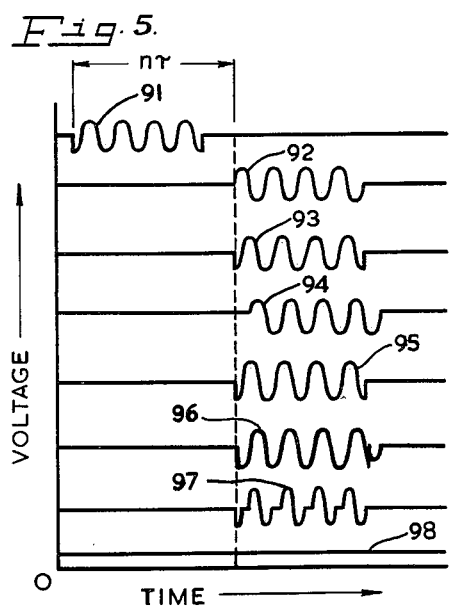

United States Patent Office 2,993,174
Patented July 18, 1961

2,993,174
CARRIER PHASE DECODER CIRCUIT
Leon J. Lader, Los Angeles, and John G. Sinclair, Jr., Manhattan Beach, Calif., assignors to Hughes Aircraft Company, Culver City, Calif., a corporation of Delaware
Filed July 31, 1956, Ser. No. 602,483
10 Claims. (Cl. 328—133)

The present invention relates in general to phase comparator networks and more particularly to a carrier phase decoder circuit for producing an output voltage whose amplitude and polarity are related to the difference in phase between the carriers of a pair of carrier pulses applied thereto.

One technique often employed in radar systems to accurately locate an object in space is to accurately determine the polar coordinates of the object, that is, to accurately determine the distance between the object and a fixed reference point on the line of intersection between a pair of horizontal and vertical planes, the vertical angle above or below the horizontal plane, and the horizontal angle to the left or right of the vertical plane. When such a technique is employed, more than one radar antenna is usually required.

In a monopulse radar system, for example, a determination of the horizontal and vertical angles usually requires the use of three antennas, the first antenna preferably being positioned at the fixed reference point, and the second and third antennas preferably being positioned at points in the horizontal and vertical planes, respectively. Thus, due to the separation of the antennas, the wave front of the carrier pulse reflected from the object, that is, the echo pulse, will arrive at the different antennas at different moments of time. As a result, the carriers of the carrier pulses arriving at the second and third antennas will be out of phase with the carrier of the carrier pulse arriving at the first antenna used as a reference. Throughout the application the term "carrier" is intended to mean either modulated carrier, sub-carrier or heterodyned frequency waves.

The extent to which the various carriers are out of phase with each other is a function of the horizontal and vertical angles. It will be obvious, therefore, to those skilled in the radar and related fields that the horizontal and vertical angles may be accurately determined by accurately determining the various phase angles between the carriers of the received carrier pulses. It will also be obvious that in order to determine these phase angles, the radar system must include phase sensitive circuits capable of producing an output signal that accurately indicates the respective phase angles.

The present invention is a phase sensitive or carrier phase decoder circuit of the type mentioned. More particularly, according to an embodiment of the present invention, the carrier pulses received at the first and either the second or third antennas are delayed in time in such a manner that two carrier pulses are produced in time coincidence and two carrier pulses are produced delayed with respect to each other by one half the carrier period. The two time coincident carrier pulses are then added and, similarly, the two delayed carrier pulses are added, the two carrier signals resulting therefrom being detected and then combined in such a manner as to produce a composite signal. The average voltage of the composite signal is substantially a direct-current voltage whose amplitude and polarity is indicative of one of the two desired phase angles. The other phase angle may be obtained by either adding an additional channel to the above circuit or by utilizing a second such circuit. It will be recognized that by suitable calibration of the direct-current voltages, the horizontal and vetrical angles may be read directly.

There are many uses for a decoding circuit that provides phase comparison of two carrier pulses occurring at different times. For example, in coding systems for identification of received pulse signals it may be desired to transmit alternate pulses with preselected phase relations and upon reception to delay the received train of pulses in one channel and maintain the train of pulses undelayed in a second channel so pulses in the two channels coincide in time. The pulses of the two channels are then decoded by phase comparison to identify the code or the received signal. The circuit in accordance with this invention is useful in this type of a decoding system where the pulses to be compared are received at the input at different times.

It is, therefore, an object of the present invention to provide a carrier phase decoder circuit that can accurately determine at least one of the two angles required in a polar coordinate system for locating the position of an object in space.

It is another object of the present invention to provide a circuit that can accurately determine the phase angle between the carriers of two carrier pulses.

It is a further object of the present invention to provide a carrier phase decoder circuit that produces an output voltage whose amplitude and polarity is indicative of the difference in phase between the carriers of two carrier pulses.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIGS. 3, 4 and 5 are graphs of the various waveforms and voltages produced at different points in the circuit of FIGS. 1 and 2.

Figure 1:
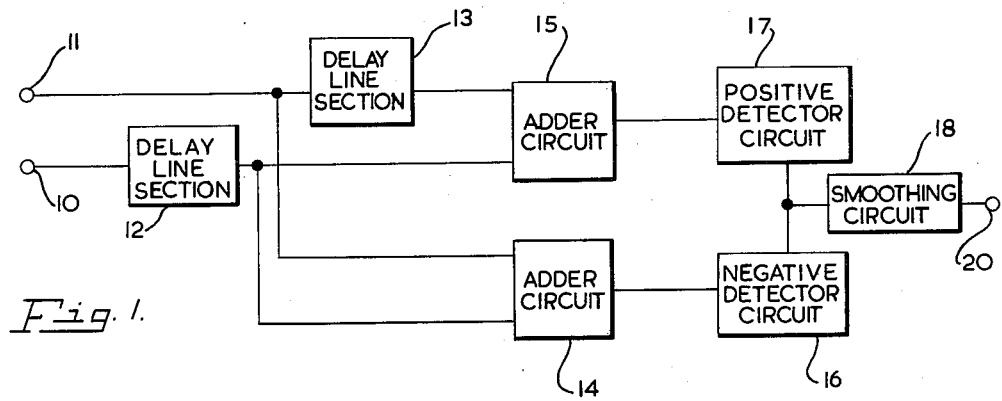
FIG. 1 is a block diagram of a carrier phase decoder circuit according to the present invention.

Referring now to the drawings there is shown in FIG. 1 a carrier phase decoder circuit, according to the present invention, for producing an output voltage whose polarity and amplitude indicates the phase difference between two groups of carrier pulses, the second group of carrier pulses being delayed with respect to the first group of carrier pulses by a fixed interval of time. As shown in the figure, the decoder circuit comprises a pair of input terminals 10 and 11 electrically connected to a pair of delay line sections 12 and 13, respectively, the first group of carrier pulses being applied to input terminal 10 and the second group of carrier pulses being applied to input terminal 11. The time delay of delay line section 12 is equal to the interval of time between a carrier pulse in the first group of pulses and a corresponding carrier pulse in the second group of pulses. Thus, for example, if the two carrier pulses referred to have a leading edge separation of $n\tau$, where $n$ is equal to zero or any positive whole number and $\tau$ is the period of the carrier, then delay line section 12 is chosen to have a delay equal to $n\tau$. The time delay of delay line section 13, on the other hand, is equal to one-half the period of the carrier, that is, $$\frac{\tau}{2}$$

The output end of delay line section 12 and the input end of delay line section 13 are electrically connected to the first and second input terminals, respectively, of a first adder circuit 14 which adds the signals produced at the output and input ends of these two delay line sections. The decoder circuit also includes a second adder circuit 15 also having first and second input terminals which are electrically connected to the output ends of delay line sections 12 and 13, respectively. Like adder circuit 14, adder circuit 15 adds the signals appearing at the output ends of the delay line sections. The output end of adder circuit 14 is electrically connected to a negative detector circuit 16 which passes to its output terminal only the negative excursions of the signal produced at the output end of adder circuit 14. Similarly, adder circuit 15 is electrically connected to a positive detector circuit 17 which passes to its output end only the positive excursions of the signal produced at the output end of adder circuit 15. The output ends of detector circuits 16 and 17 are electrically connected to the common input terminal of a smoothing circuit 18 which filters the signals produced by the detector circuits to produce at an output terminal 20 the desired output signal which indicates the relative phase between the groups of pulses applied to input terminals 10 and 11.

Figure 2:
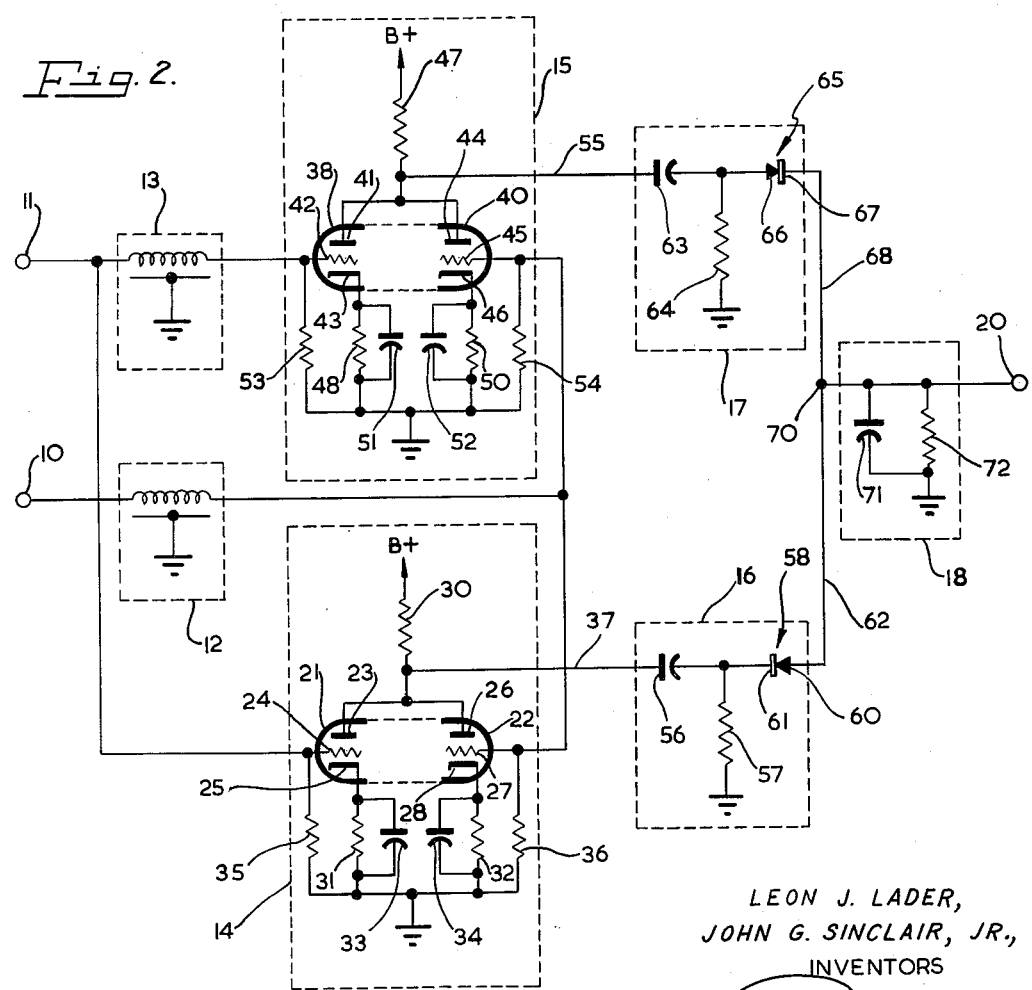
FIG. 2 is a schematic diagram of the circuit of FIG. 1.

Referring now to FIG. 2, there is shown therein a specific construction of the decoder circuit of FIG. 1. Accordingly, referring to the figure, adder circuit 14 is shown to preferably comprise a pair of twin triodes 21 and 22, the anode, the control grid and cathode of triode 21 being designated by numerals 23, 24 and 25, respectively, and the anode, control grid and cathode of triode 22 being similarly designated by numerals 26, 27 and 28. Anodes 23 and 26 are electrically connected to one end of a plate load resistor 30, the other end of the plate load resistor being electrically connected to a source of positive D.C. potential designated B+. Cathodes 25 and 28 are electrically connected through a pair of cathode bias resistors 31 and 32, respectively, to ground. A by-pass capacitor 33 is electrically connected across resistor 31 and another by-pass capacitor 34 is electrically connected across resistor 32. As is well known, by-pass capacitors 33 and 34 provide an alternating-current short between the cathodes and ground. Control grids 24 and 27 are electrically connected to the input and output ends of delay line sections 13 and 12, respectively, as previously mentioned. In addition, a pair of direct-current grid return resistors 35 and 36 are electrically connected between control grids 24 and 27, respectively, and ground. An electrical lead 37 constituting the output terminal of adder circuit 14 is electrically connected to the junction of plate load resistor 30 and anodes 23 and 26.

Adder circuit 15 is identical to adder circuit 14 and, therefore, comprises twin triodes 38 and 40 having anodes 41 and 44, control grids 42 and 45, and cathodes 43 and 46, respectively. Anodes 41 and 44 are electrically connected to one end of a plate load resistor 47, the other end of this resistor being connected to B+. Cathodes 43 and 46 are electrically connected to ground through a pair of cathode bias resistors 48 and 50, respectively. As before, cathode resistors 48 and 50 are shunted by by-pass capacitors, resistor 48 being shunted by a capacitor 51 and resistor 50 being shunted by a capacitor 52. Control grids 42 and 45 are electrically connected to the output ends of delay line sections 13 and 12, respectively, control grids 42 and 45 being additionally connected to ground, as in adder circuit 14, through a pair of direct-current grid return resistors 53 and 54, respectively. Finally, an electrical lead 55 constituting the output terminal of adder circuit 15 is electrically connected to the junction of plate load resistor 47 and anodes 41 and 44.

Negative detector circuit 16 comprises a capacitor 56, a resistor 57 and a rectifier element preferably of the crystal diode type, generally designated 58. Crystal diode 58 has an anode 60 and a cathode 61. Cathode 61 is electrically connected to one plate of capacitor 56, the cathode and this plate of the capacitor being electrically connected to ground through resistor 57. The other plate of capacitor 56 is electrically connected to electrical lead 37 and anode 60 is electrically connected to an electrical lead 62 representing the output terminal of detector circuit 16.

Positive detector circuit 17 is identical to negative detector circuit 16 except that the electrical connections of the crystal diode in circuit 17 are reversed with respect to that of crystal diode 58. Thus, positive detector circuit 17 comprises a capacitor 63, a resistor 64 and a crystal diode, generally designated 65, having an anode 66 and a cathode 67. Anode 66 is electrically connected to one plate of capacitor 63, the anode and this plate of the capacitor being electrically connected to ground through resistor 64. The other plate of capacitor 63 is electrically connected to electrical lead 55 and cathode 67 is electrically connected to an electrical lead 68 representing the output terminal of positive detector circuit 17. Electrical lead 68 is electrically joined to lead 62 at a junction point 70.

Smoothing circuit 18 is basically a filter circuit and comprises a capacitor 71 and a resistor 72, the capacitor and resistor being electrically connected in parallel between junction point 70 and ground. The ends of capacitor 71 and resistor 72 connected to junction point 70 are also electrically connected to output terminal 20. The capacitance and resistance of capacitor 71 and resistor 72, respectively, are chosen so that the time constant of the circuit is such that the output voltage produced at output terminal 20 substantially follows the average of the signal appearing at junction point 70.

In describing the operation of the decoder circuit, three different cases will be considered below which should be sufficient to provide a complete understanding of the operation. In addition to leading the second group of pulses by a predetermined interval of time, in the first case to be considered, the first group of pulses is in phase with the second group of pulses; in the second case to be considered, the first group of pulses is 180° out of phase with the second group of pulses; and in the third case, the first group of pulses is 90° out of phase with the second group of pulses. The various phase relationships will be considered more fully below.

Considering now the first case, a carrier pulse in the first group of pulses, designated 73 in FIG. 3, is received at input terminal 10. At a time $n\tau$ later, a corresponding carrier pulse in the second group of pulses, designated 74 in FIG. 3, is received at input terminal 11. Carrier pulse 73, at the time it is received, is delayed by delay line section 12 for a period of time $n\tau$, which is the interval of time by which carrier pulse 73 leads carrier pulse 74. As a result, at the output end of delay line section 12, there is produced a carrier pulse, designated 75 in FIG. 3, which is in time coincidence with received carrier pulse 74, as shown in the figure. Similarly, when carrier pulse 74 is received, it is delayed by delay line section 13 for an interval of time $$\frac{\tau}{2}$$

where $\tau$ is the carrier period, as previously explained. Thus, at the output end of delay line section 13, there is produced a carrier pulse, designated 76 in FIG. 3, which is 180° out of phase with carrier pulses 74 and 75. Summing up for purposes of clarity, carrier pulses 74 and 75 are in time coincidence and in phase while carrier pulse 76 lags carrier pulse 75 by 180°.

Carrier pulses 74 and 75 are applied to adder circuit 14 which, in response thereto, produces a first carrier signal, designated 77 in FIG. 3, whose instantaneous voltage amplitude corresponds to the sum of the instantaneous voltage amplitudes of the applied carrier pulses. More specifically, referring to adder circuit 14 in FIG. 2, carrier pulses 74 and 75 are applied to control grids 24 and 27, respectively. As a result, the current flow from B+ through load resistor 30 and tubes 21 and 22 depends to a substantially equal extent on both carrier pulse 74 and carrier pulse 75. Consequently, the amplitude of first carrier signal 77 developed across resistor 30 is proportional to the sum of carrier pulses 74 and 75, as previously mentioned.

At the same time that carrier pulses 74 and 75 are applied to adder circuit 14, carrier pulses 75 and 76 are applied to adder circuit 15 which, in response thereto, produces a second carrier signal, designated 78 in FIG. 3, whose instantaneous voltage amplitude also corresponds to the sum of the instantaneous voltage amplitudes of the applied carrier pulses. More particularly, referring to adder circuit 15 in FIG. 2, carrier pulses 75 and 76 are applied to control grids 45 and 42, respectively. Since carrier pulse 76 is 180° out of phase with carrier pulse 75, the current flow through resistor 47 is oppositely affected by carrier pulses 75 and 76, that is, the flow of current through resistor 47 tends to increase with an increase of voltage of carrier pulse 75 and simultaneously tends to decrease with a decrease of voltage of carrier pulse 76. Vice versa, the flow of current through resistor 47 tends to decrease with a decrease of voltage of carrier pulse 75 and simultaneously tends to increase with an increase of voltage of carrier pulse 76. Thus, as previously mentioned, the amplitude of second carrier signal 78 developed across resistor 30 is proportional to the instantaneous addition of carrier pulses 75 and 76.

Carrier signals 77 and 78 are applied to negative and positive detector circuits 16 and 17, respectively. It will be obvious from the arrangement of detector circuits 16 and 17, shown in FIG. 2, that negative detector circuit 16 passes only the negative half-cycles of first carrier signal 77, and positive detector circuit 17 passes only the positive half-cycles of second carrier signal 78, the positive and negative half-cycles passed by these detector circuits being additively combined at junction point 70 to produce a composite carrier signal designated 80 in FIG 3. Composite signal 80 is applied to smoothing circuit 18 which, in response thereto, produces an output voltage at output terminal 20, designated 81 in FIG. 3, whose voltage amplitude and polarity correspond to an average of the voltage variations of the composite signal. In the particular case under discussion, the polarity of output voltage 81 is generally negative and the amplitude of the voltage is a maximum.

Considering now the second case, a carrier pulse in the first group of pulses, designated 82 in FIG. 4, is received at input terminal 10, and at a time $n\tau$ later, a corresponding carrier pulse in the second group of pulses, designated 83 in FIG. 4, is received at input terminal 11. In addition to lagging carrier pulse 82 by time interval $n\tau$, the carrier of carrier pulse 83 is 180° out of phase with the carrier of carrier pulse 82.

Carrier pulses 82 and 83 are applied to delay line sections 12 and 13 which delay the carrier pulses by time periods $n\tau$ and $$\frac{\tau}{2}$$

respectively. Hence, as before, at the output end of delay line section 12, there is produced a carrier pulse, designated 84 in FIG. 4, which is in time coincidence with received carrier pulse 83, as shown in the figure. However, the carrier of carrier pulse 83 remains 180° out of phase with the carrier of carrier pulse 84. Similarly, at the output end of delay line section 13, there is produced a carrier pulse, designated 85 in FIG. 4, whose carrier is in phase with the carrier of carrier pulse 84 but which is delayed with respect thereto by time interval $$\frac{\tau}{2}$$

Carrier pulses 84 and 85 are applied to adder circuit 15 and, simultaneously, carrier pulses 83 and 84 are applied to adder circuit 14. The adder circuits add the instantaneous values of voltage applied to them or, stated differently, adder circuits 14 and 15 produce first and second carrier signals, designated 86 and 87, respectively, whose instantaneous voltage amplitudes correspond to the sum of the instantaneous voltage amplitudes of the applied carrier pulses. It will be noted that since the carriers of carrier pulses 83 and 84 are 180° out of phase, the instantaneous addition of these pulses produces a null, that is, a substantially zero voltage output, as indicated by signal 86.

Signals 86 and 87 are applied to negative and positive detector circuits 16 and 17, respectively, and as previously mentioned in the discussion of case 1, the detector circuits pass the negative and positive half-cycles to produce a composite signal, designated 88 in FIG. 4, at junction point 70. Composite signal 88 is smoothed by smoothing circuit 18 and, as a result, an output voltage, designated 90 in FIG. 4, is produced at output terminal 20, which output voltage has a voltage amplitude and polarity corresponding to the average of the voltage variations of the composite signal. In case 2, the polarity of output voltage 90 is positive and the amplitude of the voltage is again a maximum.

Considering now the third and last case, a carrier pulse in the first group of pulses, designated 91 in FIG. 5, is received at input terminal 10, and a carrier pulse in the second group of pulses, designated 92 in FIG. 5, is received at input terminal 11. As in the earlier cases, carrier pulse 92 lags carrier pulse 91 by time interval $n\tau$ and, in addition, in the present case, the carrier of carrier pulse 92 is 90° out of phase with the carrier of carrier pulse 91.

Applying the same operations to carrier pulses 91 and 92 as were previously applied to carrier pulses 73 and 74 in case 1 and carrier pulses 82 and 83 in case 2, it will be seen that at the output end of delay line section 12, there is produced a carrier pulse, designated 93 in FIG. 5, that is in time coincidence, but 90° out of phase with, carrier pulse 92, while at the output end of delay line section 13, there is produced a carrier pulse, designated 94 in FIG. 5, which is delayed with respect to carrier pulse 92 by time interval $$\frac{\tau}{2}$$

and 90° out of phase with carrier pulse 93. As shown in the figure, the carrier of carrier pulse 92 leads the carrier of carrier pulse 93 by 90°, whereas the carrier of carrier pulse 94 lags the carrier of carrier pulse 93 by 90°.

Carrier pulses 92, 93, and 94 are applied as before to adder circuits 14 and 15 and, in consequence thereof, first and second carrier signals, designated 95 and 96, respectively, in FIG. 5, are produced whose instantaneous voltage amplitudes correspond to the sum of the instantaneous voltage amplitudes of the applied carrier pulses. Carrier signals 95 and 96 are applied to negative and positive detector circuits 16 and 17, respectively, and as a result, a composite signal, designated 97 in FIG. 5, is produced at junction point 70. It will be noted that in the present case, the total area under the curve is zero for all practical purposes, that is, composite signal 97 is substantially symmetrical. Accordingly, when composite signal 97 is smoothed or averaged by smoothing circuit 18, the output voltage produced at output terminal 20, designated 98 in FIG. 5, is substantially zero.

Reviewing for purposes of clarity, when the carriers of the received carrier pulses are in phase with each other, which is the situation in case 1, the output voltage is of maximum amplitude and negative polarity; when the carriers of the received carrier pulses are 180° out of phase with each other, which is the situation in case 2, the output voltage is of maximum amplitude and positive polarity; and when the carriers of the received carrier pulses are 90° out of phase with each other, which is the situation in case 3, the output voltage is zero, and, naturally, of no polarity. It will thus be seen that the net transfer function of the circuit of the present invention over a 180° phase difference is a monatonic curve extending from some negative value for in-phase carrier pulses through zero for 90° out-of-phase pulses, to a positive value for 180° out-of-phase pulses.

It should be noted that an appropriate transformer may be substituted for delay line section 13 in FIGS. 1 and 2 with beneficial results. Thus, a transformer would bring about the desired 180° phase shift of carrier pulses 74, 83 and 92 without, at the same time, causing the undesirable transients shown, for example, in waveforms 78, 80 and 81 of FIG. 3.

What is claimed as new is:

1. A carrier phase decoder circuit for producing an output voltage whose polarity and amplitude substantially represent the difference in phase between a first received carrier pulse and a second received carrier pulse lagging said first carrier pulse by a predetermined interval of time, said circuit comprising: first means for delaying the first carrier pulse by the predetermined interval of time to produce a third carrier pulse coincident in time with the second carrier pulse; second means for delaying the second carrier pulse by an interval of time equal to one-half the carrier period to produce a fourth carrier pulse 180° out of phase with the second carrier pulse; a first circuit electrically connected to the output and input ends of said first and second means, respectively, said first circuit being responsive to the second carrier pulse and said third carrier pulse for producing a first signal whose voltage amplitude corresponds to the sum of the instantaneous values of voltage of the second and said third carrier pulses; a second circuit electrically connected to the output ends of said first and second means, said second circuit being responsive to said third and fourth carrier pulses to produce a second signal whose voltage amplitude corresponds to the sum of the instantaneous values of voltage of said third and fourth carrier pulses; third and fourth circuits electrically connected in series between the output ends of said first and second circuits, said third and fourth circuits passing the positive and negative voltage excursions of said first and second signals, respectively, to produce a composite signal whose voltage amplitude is equal to the instantaneous sum of the positive and negative voltages passed by said third and fourth circuits; and a fifth circuit electrically connected to the output ends of said third and fourth circuits for producing, in response to said composite pulse, an output voltage whose polarity and amplitude correspond to the polarity and average value of voltage of said composite pulse.

2. A carrier phase decoder circuit for producing an output voltage whose polarity and amplitude substantially represent the difference in phase between a first received carrier pulse and a second received carrier pulse lagging said first carrier pulse by a predetermined interval of time, said circuit comprising: a first delay line section having a time delay equal to the predetermined time interval between the first and second carrier pulses for bringing the first carrier pulse into time coincidence with the second carrier pulse; a second delay line section having a time delay equal to one-half the carrier period for shifting the phase of the second carrier pulse by 180°; a first adder circuit electrically connected to the output and input ends of said first and second delay line sections, respectively, for instantaneously adding the second and delayed first carrier pulses to produce a first signal; a second adder circuit electrically connected to the output ends of said first and second delay line sections for instantaneously adding the delayed first and delayed second carrier pulses to produce a second signal; a positive rectifying detector circuit electrically connected to said second adder circuit for passing only the positive half-cycles of said second signal; a negative rectifying detector circuit electrically connected to said first adder circuit for passing only the negative half-cycles of said first signal; and an electrical filter circuit connected to said positive and negative rectifying detector circuits for averaging said passed positive and negative half-cycles to produce an output voltage whose polarity and amplitude correspond to the difference in phase between the first and second carrier pulses.

3. A carrier phase decoder circuit for producing at an output terminal an output voltage whose polarity and amplitude substantially represent the difference in phase between a first carrier pulse received at a first input terminal and a second carrier pulse, lagging said first carrier pulse by a predetermined interval of time, received at a second input terminal, said decoder circuit comprising: first, second, third and fourth triodes having first, scond, third, and fourth anodes, respectively, first, second, third and fourth control grids, respectively, and first, second, third and fourth cathodes, respectively; a first load resistor electrically connected between a source of positive potential and said first and second anodes; a second load resistor electrically connected between a source of positive potential and said third and fourth anodes; a first delay line section electrically connected between said second and fourth control grids and the first input terminal, said first delay line section having a time delay equal to the predetermined time interval between the first and second carrier pulses for bringing the first carrier pulse into time coincidence with the second carrier pulse; a second delay line section electrically connected at its input end to the second input terminal and to said first control grid and electrically connected at its output end to said third control grid, said second delay line section having a time delay equal to one-half the carrier period for shifting the phase of the second carrier pulse by 180°; first and second diodes having fifth and sixth anodes, respectively, and fifth and sixth cathodes, respectively, said fifth anode and said sixth cathode being electrically connected to the output terminal; first and second grid-leak resistors electrically connected between said fifth cathode of said first diode and said sixth anode of said second diode, respectively, and to ground; a filter capacitor electrically connected between the output terminal and ground; and a filter resistor electrically connected in parallel with said filter capacitor.

4. A circuit for producing an output signal representing the phase difference between a first and a second group of alternating positive and negative pulses applied to a first and a second input respectively, with the pulses of said first group occurring at different times than the pulses of said second group, said circuit comprising: a first and a second delay means connected to said first and second inputs respectively, a first adder circuit connected to the output of said first delay means and said second input; a second adder circuit connected to the outputs of said first and said second delay means; detector means connected to the outputs of said first and said second adder circuits; and an electrical filter circuit including a resistor and a capacitor connected to the output of said detector means and having an output on which said output signal is formed.

5. A circuit for determining the phase difference between a first group of alternating signals and a second group of alternating signals, said circuit comprising: delay means connected to delay said second group of alternating signals for one-half the period of one cycle thereof; first adder means connected to receive said first and said second group of alternating signals; second adder means connected to receive said first group of alternating signals and connected to the output of said delay means; detector means connected to the output of said first adder means and the output of said second adder means; and electrical filter means connected to the output of said detector means to form an output signal representing said phase difference.

6. A phase determining circuit for producing an output voltage whose polarity and amplitude varies with the phase difference between a first group of cyclic pulses and a second group of cyclic pulses lagging said first group of pulses by a predetermined interval of time, each of said cycles including a positive and a negative pulse, said circuit comprising: first delay means for delaying said first group of pulses equal to said predetermined interval of time to produce a third group of pulses coincident in time with said second group of pulses; second delay means for delaying said second group of pulses for a period equal to one-half of a cycle, to produce a fourth group of pulses; first adder means connected to receive said second and third group of pulses to produce a first signal of amplitude having the instantaneous sum of said second and third group of pulses; second adder means connected to receive said third and fourth group of pulses to produce a second signal having the amplitude of the instantaneous sum of said third and fourth group of pulses; a first circuit connected to receive said first signal to pass only the negative pulses of said first signal; a second circuit connected to receive said second signal to pass only positive pulses of said second signal; and combining means connected to the output of said first and second circuit including averaging means, to combine and average the signals therefrom to produce said output voltage.

7. A phase decoder circuit for producing an output voltage whose polarity and amplitude represents the phase difference between a first group of carrier pulses and a second group of carrier pulses lagging said first group of carrier pulses by a predetermined interval of time, said circuit comprising: first delay means connected to receive and delay said first group of pulses equal to said predetermined interval of time to produce a third group of pulses starting at a time substantially coincident with said second group of pulses; second delay means connected to receive and delay said second group of pulses for a period equal to one half the carrier period, to produce a fourth group of pulses; first adder means connected to receive said second and third group of pulses to pass a first signal of amplitude of the instantaneous sum of said second and third group of pulses to an adder output; second adder means connected to receive said third and fourth group of pulses to pass a second signal which is the instantaneous sum of said third and fourth group of pulses to an adder output; a first circuit connected to receive said first signal to pass to an output only the portions of said first signal which are of one polarity; a second circuit connected to receive said second signal to pass to an output only said portions of said second signal which are of the other polarity; and means including averaging means connected to combine and average said portions of said first and second signals passed to said outputs of said first and second circuits to produce said output voltage.

8. A phase decoder circuit for producing an output voltage whose polarity and amplitude represent the phase difference between a first and a second group of carrier pulses, said circuit comprising: a first and a second source to provide said first and second group of carrier pulses respectively, said groups of pulses starting their occurrence at substantially the same time; means for delaying said group of carrier pulses an interval of time equal to one half the carrier period to produce a third group of carrier pulses; a first adder circuit connected to receive said first and second group of carrier pulses and having an output to which is passed first signals corresponding to the sum of the instantaneous voltage values of said first and second group of pulses; a second adder circuit connected to receive said second group of carrier pulses and connected to said delay means to receive said third group of carrier pulses, and having an output to which is passed second signals corresponding to the sum of the instantaneous voltage values of said first and third group of pulses; a first and second detector circuit connected to the output of said first and second adder means, respectively, said first and second detector circuits each passing to an output, voltage excursions of said first and second signals of a polarity opposite to those voltage excursions passed by the other; and means including averaging means connected to said outputs of said first and second detector circuit to combine and to average said voltage excursion of said first and second signals to form said output voltage.

9. A phase decoder circuit for producing an output voltage whose polarity and amplitude represent the phase difference between a first and a second group of carrier pulses, said circuit comprising: a first and a second source to provide said first and second groups of carrier pulses respectively, with said first and second groups of carrier pulse occurring during a common interval of time; inverting means to be connected to invert said first carrier pulses to form a third group of pulses; a first circuit connected to said first and second source to form a first signal at an output whose amplitude corresponds to the sum of the instantaneous voltage values of said first and second group of carrier pulses; a second circuit connected to said first source and to the output of said inverting means to form a second group of signals at an output whose amplitude corresponds to the sum of the instantaneous voltage values of said first group of carrier pulses and said third group of pulses; third and fourth circuits connected to the outputs of said first and second circuits respectively, one of said third and fourth circuits passing only positive voltage excursions to an output, and the other only passing negative voltage excursions to an output; and means including averaging means connected to said third and fourth circuits to receive said positive and negative voltage excursions and to combine and average the values of said voltage excursions to form said output voltage.

10. A phase representing circuit for producing an output signal whose polarity and amplitude represents the phase difference between a first group of carrier pulses and a second group of carrier pulses comprising: a first and a second source to provide said first and second groups of carrier pulses respectively, said first and second groups occurring at substantially the same interval of time; means connected to said second source for changing the phase of said first group of pulses 180° in reference to fixed interval of time to produce a third group of pulses; a first adder circuit connected to receive and combine the positive and negative values of said first and second group of carrier pulses to form a first voltage signal at an output; a second adder circuit connected to receive said second group of carrier pulses and connected to said means to change the phase, to receive said third group of pulses to form a second voltage signal at an output; detector means connected to the outputs of said first and second adder to pass the positive excursions of said voltage signals from one of said adder and the negative excursions from the other of said adders, means connected to the output of said detector means, said means including averaging means to combine and average said voltage excursions to form said output signal.

References Cited in the file of this patent

UNITED STATES PATENTS

| | | |
|---|---|---|
| 2,425,009 | Shepherd | Aug. 5, 1947 |
| 2,484,824 | Hansel | Oct. 18, 1949 |
| 2,517,549 | Earp | Aug. 8, 1950 |
| 2,632,792 | Selz | Mar. 24, 1953 |
| 2,706,274 | Boyer | Apr. 12, 1955 |
| 2,716,235 | Isbister | Aug. 23, 1955 |
| 2,813,241 | Smith et al. | Nov. 12, 1957 |